Patented Apr. 24, 1934

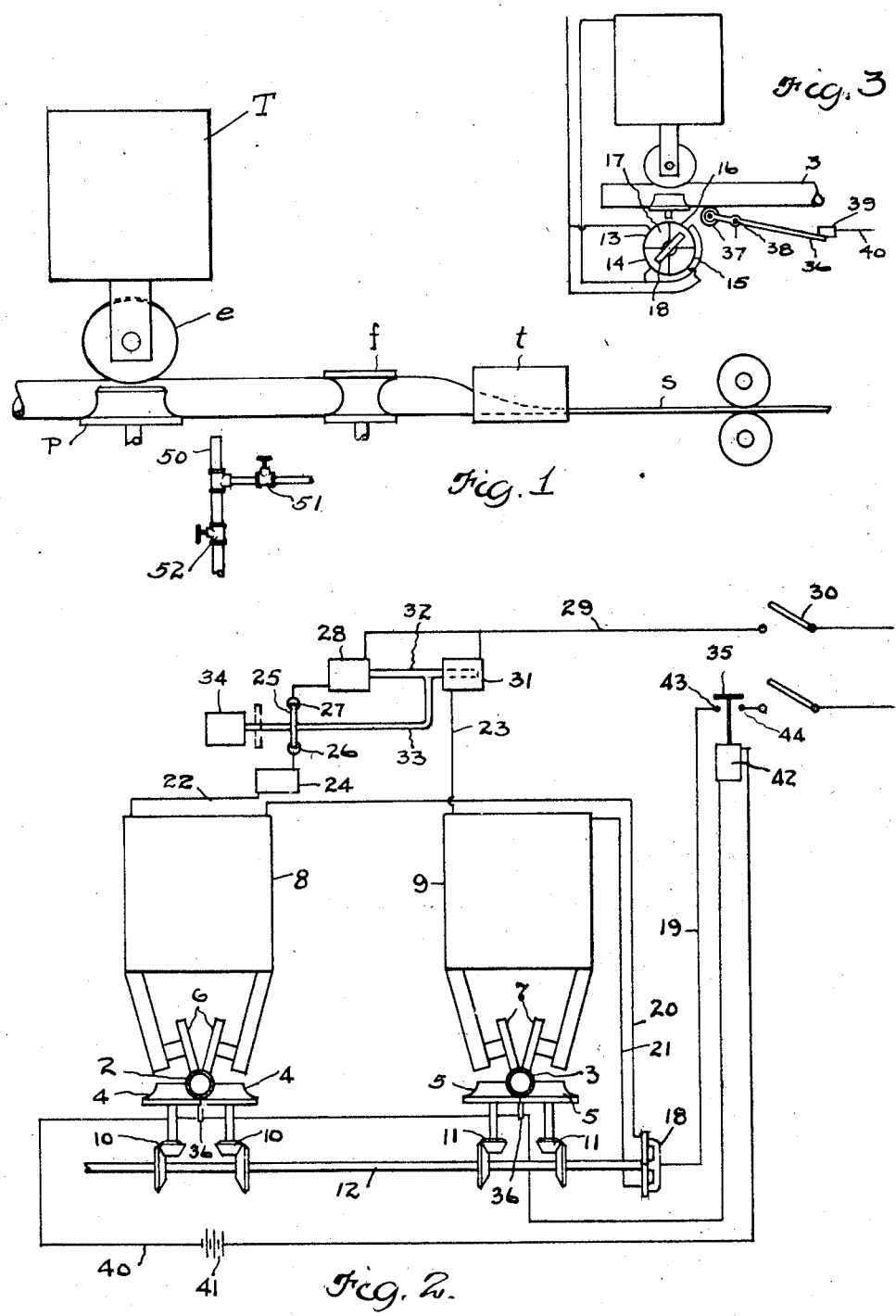

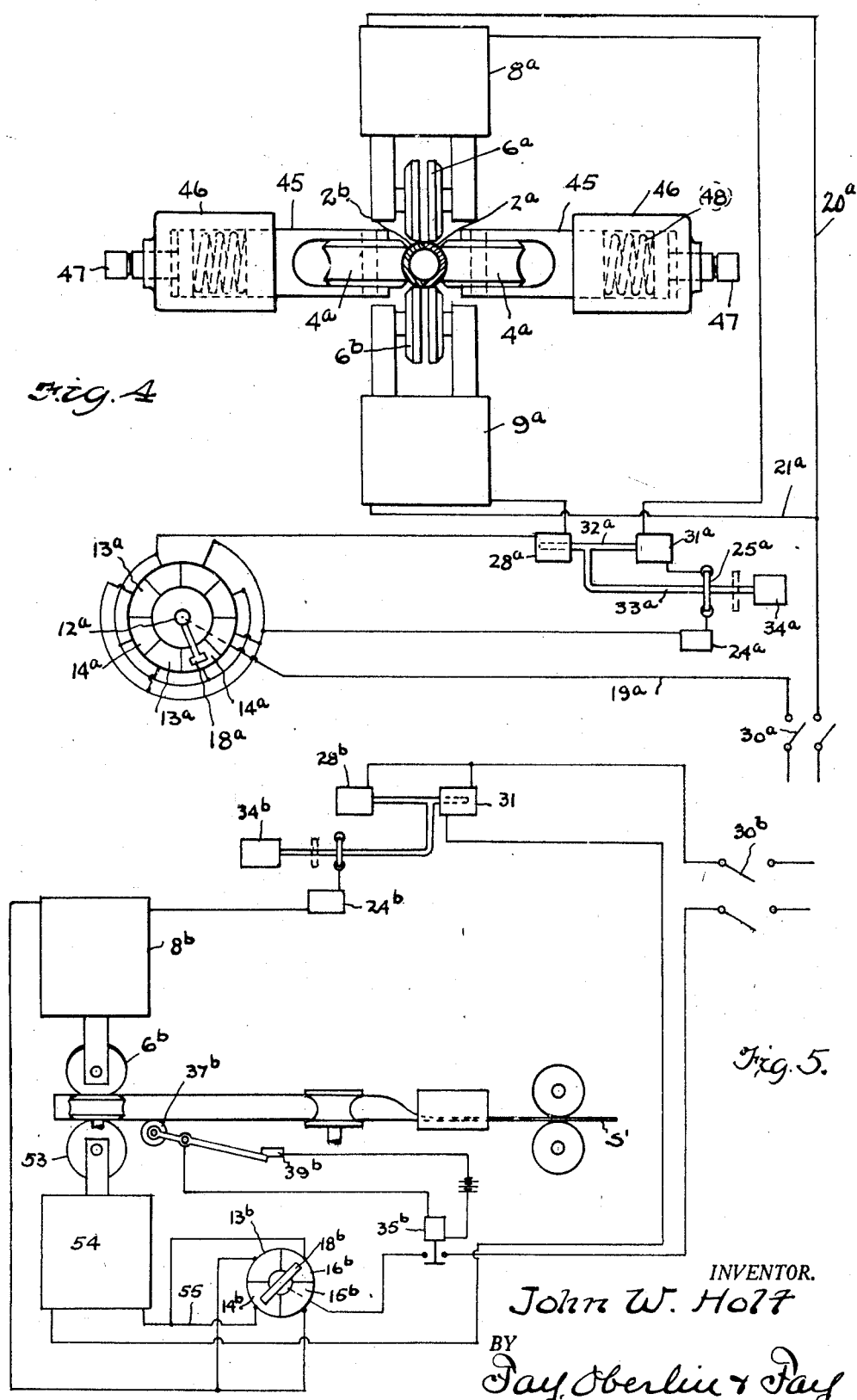

1,956,172

UNITED STATES PATENT OFFICE 1,956,172

METHOD AND MEANS FOR ELECTRIC WELDING

John W. Holt, Southington, Conn.

Application September 23, 1929, Serial No. 394,597

11 Claims. (Cl. 219—10)

In the customary practice of electric welding, where a continuous welding current is passed across a seam to which is applied mechanical compression, there is a very marked tendency to excessive flash or fin formation. This is not only objectionable in itself, but also further necessitates a grinding or finishing operation in instances where the final appearance is of any importance. A procedure and means which will make possible the control of fin-forming tendency, and apply current efficiently and economically, is accordingly a desideratum, and highly desirable.

To the accomplishment of the foregoing and related ends, the invention, then, consists of the features hereinafter fully described, and particularly pointed out in the claims, the following description and the annexed drawings setting forth in detail certain features embodying the invention, such being illustrative however of but a few of the various ways in which the principle of the invention may be employed.

In said annexed drawings:

Fig. 1 is a semi-diagrammatic side elevation showing one form of apparatus contemplated in accordance with the invention; Fig. 2 is an end elevation showing semi-diagrammatically apparatus contemplated in the invention, including the wiring circuits; Fig. 3 is a side elevation of the same; Fig. 4 is a front elevation of another modification; and Fig. 5 is a side elevation of a modification.

In accordance with the invention, a welding current providing impulses is applied across the assembled portions, and for welding plate metal where an edge is apposed with application of pressure, or more particularly for butt-welding plate metal where the edges to be united are held under pressure in abutting register, current is passed across the seam in successive impulses intervaled to produce incipient fusion only at closely spaced intervals along the seam and heated but non-fused portions between such incipiently-fused portions, the non-fused portions limiting the extent to which the edges are forced together and correspondingly limiting flash-over. Relative travel, either the current-applying electrodes being stationary and the work being moved therepast, or the electrodes being mounted so as to travel at controlled rates along the work, may afford a proper distribution of the current so applied.

In very thin sections, this procedure can be applied by passing the seam under the current applying electrode, or moving the electrode, at proper speed, while an alternating current is supplied, the impulses or alternations of the current in such case developing the spaced incipiently-fused points permitting the union while suitable pressure is applied. With lower ranges of frequency in commercially supplied alternating current, light work may be handled, or frequency changers may be employed to still further reduce the frequency rate in accordance with the particular work requirements.

As the thickness of the material to be welded increases however, the amount of current required to develop the necessary heat in a single impulse becomes excessive. Also where a tube is being welded for instance, the time required for the fused portion to come down to a holding temperature to retain the seam strength after passing the pressure-weld zone becomes longer, and there is a tendency for the seam to open up after passing the pressure rolls due to the stress set up in bending the wall into tube form. The conditions are provided for in accordance with the invention by supplying the welding current in successive impulses or intermittently at suitable time intervals. This may be accomplished in simple form by opening and closing the circuit of the current while suitably causing relative travel as regards the work. If the work is of a heavier character and the current requirements such as to thus develop arcs at the switch or make and break device, as well as undesirable fluctuations in the primary electric circuit due to the variations in the load, I alternately divert the current from the welding electrode to a resistance circuit of approximately equal value. Where it is desired to further avoid any waste by use of a simple resistance circuit, the resistance circuit can take the form of another welding circuit on a similar class of work. Two welders operated simultaneously with a switch or control device alternately diverting the current from one to the other welder may thus be provided with most advantageous results. If desired, one primary welding circuit at least may be equipped with a choke or reactance coil to aid in balancing the load, and this may be operated for instance by two solenoids, one in each primary welding circuit, and a dash pot, so as to make the action automatic.

As the thickness of the wall increases and with it the tendency of the seam in tube welding to spring open, I may also apply sufficient heat to the other side of the tube as it enters the welding throat to soften it at this point during the welding operation and remove the stress set up by bending and forming the tube. Such heating can be accomplished for instance by a gas torch, or a carbon arc, or preferably by a second transformer and electrode rolls. In such forms of electrically applied heat, such heating circuit may be the alternative circuit with the welding circuit, the current being diverted in succession from one to the other in suitably rapid sequence, and the portion of heat applied at the weld and that applied at the other side of the tube can be adjusted as desired by the relative dwell of the contacts on the switch or current distributor.

In applying the process with extremely heavy wall tube making, it is advantageous to form the tube in two half sections, thus involving two seams, and the welding current can then be alternately shifted from one seam to the other, in accordance with the principles discussed.

With the employment of alternating current on very thin walled tube stock, for instance in accordance with a layout as in Fig. 1, a strip of a thin sheet metal s may be fed along into an edge-turning throat t, bending the edges up channel-wise and presenting them to the forming-rolls f which close the edges into final tube form. The tube now ready for welding is passed through the pressure rolls p for preserving the shape and pressing the edges of the seam suitably together, while alternating current is passed across the seam by an electrode, preferably an electrode roll or rolls e, these being in electrical connection with the transformer T. Depending upon the gauge of stock and the frequency of the A. C., the rate of feed of the strip s may be readily adjusted, and the current impulses will thus be passed across the seam at intervals spaced along the seam, incipiently fusing the metal at such points but with heat therebetween insufficient to bring to fusion, and the unfused points thus limit the extent of yielding under the pressure of the pressure rolls, while the points of fusion are yet sufficiently forced together to provide a good union. With the skip points of current passage thus closely but not too closely approximated, a line of union along the seam may be had, and light stock may be handled at a rapid rate.

As indicated, with heavier stock, the current is supplied in impulses by suitably interrupting its flow as fed to the welding zone, and with a set up of apparatus as shown in Fig. 1, heavier stock may be handled, and the current may be simply intermitted, being alternately thrown into the welding electrode and then into any suitable resistance, as needs not be particularly detailed. It is preferable however to employ another heating circuit or another welding circuit as the resistance. In such case, either a stock-heating circuit may be employed with a welding circuit, as will be described more particularly hereinafter with reference to Fig. 5, or two welding circuits may be employed, as will be described more particularly in connection with Fig. 4, or two welding circuits may be employed, as indicated in Fig. 2. In the latter, two pieces of work, for instance tubing 2, 3, are being seamed simultaneously, the sheet metal being formed up into tube shape and passed between the pressure rolls 4, 4, and 5, 5, respectively, while the electrode rolls 6, 6, and 7, 7, respectively, bear along close to the edges to be welded. The electrode rolls are in electrical connection with the respective transformers 8, 9, and any suitable means, the detail of which it is unnecessary to show, may regulate the position and pressure of the electrode rolls with respect to the work. The pressure rolls 4, 4, and 5, 5, may be driven for instance through bevel gearing 10, 10, and 11, 11 from a shaft 12 which may be operated by a motor or other convenient drive. Arranged to be also operated by the shaft 12 is a switch or current distributor to alternately divert the current between the two welders. This may involve a rotating member carried by the shaft and a stationary member coacting, the changing relative positions switching the connection from circuit to circuit alternately. A commutator-like group of segments may be arranged as one such member, and a brush-like contactor as the other, and either such member may be rotated by the shaft, while the other member is held stationary to contact therewith. In the particular form illustrated in Figs. 2 and 3, the assemblage of conductive segments 13, 14, 15 and 16 with mica or other insulation 17 between, forms a compact commutator-like structure secured to and rotating with the shaft, while a contactor 18, spring-pressed or otherwise conveniently held against the face of the segments is connected with a lead 19. The precise number of segments 13, 14, etc., on the distributor may be two or more, in the simplest case two, one connected to each transformer lead, being adequate. With quite heavy currents however, it is desirable to increase the surfaces of contact and spread the load thereacross, and correspondingly the number of segments may be increased. With four segments as shown in Figs. 2 and 3, one pair of segments 13, 15, may be connected by a lead 20 to transformer 8, and the other pair of segments 14, 16 may be connected by a lead 21 to transformer 9. The contactor 18 in such case bridges each pair of segments together in circuit simultaneously, and increases to such extent the surfaces involved, thereby lowering the current density of any circuit and lessening punishment upon the distributor. The transformer circuits to the line are completed in turn by connections 22, 23, but desirably a choke coil or reactance 24 may be included in one such connection, and be automatically switched in and out by the switch arm 25 which at the position shown in full line bridges spaced contact points 26 and 27, the former connecting to the choke coil 24, and the latter being connected to a solenoid 28 from which in turn a lead 29 goes to the service switch 30 at the inlet from the main supply line. Another solenoid 31 in the connection from the other transformer is also arranged so as to operate in common upon an armature-core 32 reciprocable between the solenoids. The switch-carrying bar 33 movable with and operated by the armature-core carries the switch arm 25, and extends onto a dash pot or the like 34.

While the lead 19 from the distributor may be taken direct to the main inlet switch 30, it is preferable to make connection through a relay switch 35 which is controlled by the work, such as to be put into operation at the proper time when the work is proceeding to the welding zone. For this, a trip or circuit closure, for instance a lever 36, may be arranged such as to be operated by the on-coming tube 3, the roller 37 being forced down thereby so as to swing the lever 36 about its pivot mounting 38 and complete the circuit through fixed contact 39 and connection 40 to a source of relay current 41 and to a solenoid or electromagnetic operating means 42 for the bridging arm 35. Normally, a spring or like means may maintain the bridging arm 35 in circuit-breaking position, but on closing of the circuit by the advancing work, the bridging arm 35 is pulled into position to complete the main circuit across the contacts 43, 44.

As will be clear from the foregoing, with the main line switch 30 closed and with welding stock fed in and shaped up into tube form and introduced to the pressure rolls 4, 4, and 5, 5, the relay-circuit closures 36, 36 as actuated by the advancing tube are operated to close the relay circuit through the solenoid or the like 42, thereby pulling the bridging arm 35 into position to close across the contacts 43 and 44 of the transformer circuit. With the shaft 12 suitably driven, the current distributor 13, 14, 15, 16, 18, successively diverts the current to the transformers 8, 9 alternately, and the respective solenoids 28 and 31 operate the switch arm 25 to throw the choke 24 in and out of circuit.

With very thick walled stock in the formation of tubing, it is further desirable to shape up half sections, 2a, 2b, Fig 4, and these are fed in apposed relation through the welding machine, which may then be equipped with an additional or lower set of electrode rolls. As illustrated in Fig. 4, the upper electrode roll 6a may be connected with the transformer 8a, and the lower electrode rolls 6b with the transformer 9a. Pressure rolls 4a are correspondingly arranged to bear upon the walls of the tubing, and convenient adjustability may be provided, for instance by mounting the shanks 45 of the roll carriers in fixed boxes 46, the shanks being then longitudinally adjustable with respect thereto by adjusting screws 47. A spring 48 may be interposed between the shank and the abutment. The distributor may follow the form already described, or for instance may be of a single-arm character, the contactor-arm 18a being secured to the shaft 12a, while the contact-segments 13a with mica or other insulation therebetween may be mounted in stationary position so as to be swept over by the contactor 18a in its travel. In such arrangement, alternate contact segments 13a may connect with one transformer, and contact segments 14a with the other transformer. Any simple slip ring or other rotary connection may carry the current between the contactor-operating shaft 12a and the lead 19a. A choke coil or reactance 24a may be provided in one of the transformer circuits, and may be automatically switched in and out by a switch 25a reciprocable by the solenoids 28a, 31a operating an armature-core 32a and a switch rod 33a secured thereto. A dash pot 34a may also be incorporated if desired. The circuit through the transformers is completed by leads 20a, 21a, to the main switch 30a.

With this arrangement, the half sections for the tube, 2a, 2b are fed in between the pressure rolls 4a, 4a and welding current is supplied through the respective electrode rolls in alternation from one seam to the other, as switched by the distributor 18a in its travel about the contact segments, thus producing along each seam in the relative travel spaced apart softened points, with the intervening metal sufficiently hot to complete the weld without deformation into excessive flash. In such manner, very thick walled stock may be advantageously and efficiently handled.

Where it is desired to minimize the tendency for the seam to spring open beyond the welding zone, heat may be applied to the other side of the tube sufficient to soften it to remove stress introduced from the bending up. A gas torch 50, Fig. 1, may be positioned in association with the path of the work, and gas and air supply may be controlled by valves 51, 52, in accordance with requirements. Preferably, a heating-current supply electrode 53, Fig. 5, supplied by a transformer 54 may provide the softening heat, and in such case, the heater-circuit may be connected up to be the resistance for the alternate diversion of the welding current. For this, a distributor-contactor 18b may be arranged to coact with segments 13b, 14b, 15b, 16b, one set of segments 13b, 15b connecting to the welding transformer 8b while the other set 14b, 16b connects by a lead 55 to the heating transformer 54. It is desirable also to incorporate a relay control; a trip 37b in the path of the advancing work being arranged to complete the circuit at contact 39b and actuate the relay switch 35b when the work is ready to advance into the welding zone.

Line current is, as before, made available by the closing of the main switch 30b, and with the machine in operation, the tubing blank s' is advanced and shaped, and heat is applied from the heating current of electrode 53, and this and the welding electrodes 6b alternately receiving current, as switched by the distributor 18b, 13b, etc. As before, if desired, a choke 24b and switching solenoids 28b, 31b, may be arranged in the welding-transformer circuit.

As thus supplied in any case, the welding current of a character providing intervaled impulses is applied in relative travel along the work, and spaced softened points for rapid and effective welding are had, guarded however against excessive flashing or fin formation by the intervening points in which the heat has been insufficient to bring about deformable softening, yet allowing a continuous effective seam to be had. The welding current may correspondingly also be divided up between working points so as to eliminate excessive heat waste, and therefore efficiently distribute the energy in accordance with requirements.

Other modes of applying the principle of the invention may be employed, change being made as regards the details disclosed, provided the steps or means stated in any of the following claims, or the equivalent of such, be employed.

I therefore particularly point out and distinctly claim as my invention:—

1. A method of electric welding which comprises passing a welding current across the portions to be welded, applying pressure thereto, and selectively heat-softening the portion of the work opposite in which stress is present to thereby control such stress.

2. A method of electric welding, which comprises abutting seam-blank edges together, passing a welding current thereacross while causing relative travel between the work and the point of application of the current, applying pressure across the seam, and electrically selectively heat-softening an opposite portion of the work to control stress therein.

3. A method of electric welding, which comprises forming a blank into tube shape, passing a welding current across the seam formed by the meeting edges, causing relative travel between the work and the point of application of the current, applying pressure across the seam, and selectively heat-softening the opposite portion of the work to control stresses by applying a heating current thereto.

4. A method of electric welding, which comprises simultaneously operating at two zones, by causing relative movement between the work and the points of application of the current, and alternately diverting the welding current to the respective welding zones in timed relation to the movement.

5. A method of electric welding, which comprises simultaneously operating on two seams, by causing relative movement between the work and the points of application of the current, and alternately diverting the welding current to the respective seams in timed relation to the movement.

6. A method of electric welding, which comprises forming a tubing-blank into relation with abutting seams, and simultaneously operating at two zones by causing relative movement between the work and the points of application of the current, and alternately passing welding current into the respective zones in timed relation to the movement.

7. A method of electric welding, which comprises forming sections up into a tube with opposite seams, causing relative movement between the work and the points of application of the current and alternately diverting the welding current from one seam to the other in timed relation to the movement.

8. Apparatus of the character described, which comprises a plurality of welding electrodes, means in common for supplying current thereto, means providing relative movement between the electrodes and work to be welded, and a distributor for alternately switching the current from one electrode to the other in timed relation to the movement.

9. Apparatus of the character described, which comprises a plurality of welding electrodes, means in common for supplying current thereto, means providing relative movement between the electrodes and work to be welded, and a distributor for alternately diverting the current to the respective electrodes in timed relation to the movement.

10. Apparatus of the character described, which comprises a plurality of welding electrodes, means in common for supplying current thereto, pressure rolls adjacent each electrode and spaced apart to receive the work therebetween, means for driving the pressure rolls, and a distributor coordinated therewith for alternately diverting the current to the respective electrodes.

11. Apparatus of the character described, which comprises a plurality of welding electrodes in parallel mounting, pressure rolls adjacent each electrode and spaced apart to receive the work therebetween, a transformer in circuit with each electrode, switching means therefor, including a distributor having a fixed contact in circuit with each electrode and transformer, a moving contactor geared with the pressure rolls and passing over the respective fixed contacts in turn thereby alternately diverting the welding current to the respective electrodes, a damping choke, means for switching said choke into and out of one of the transformer circuits, and a control for the welding circuits including a trip in the path of the work and an electrically controlled switch for opening and closing the electrode circuits.

JOHN W. HOLT.